(12) United States Patent
Kung et al.

(10) Patent No.: US 9,304,021 B2
(45) Date of Patent: Apr. 5, 2016

(54) MEASURING ELECTRONICS AS WELL AS MEASURING SYSTEM FORMED THEREWITH

(71) Applicant: Endress + Hauser Flowtec AG, Reinach (CH)

(72) Inventors: Thomas Kung, Basel (CH); Andre Spahlinger, Bad Bellingen (DE); Markus Rufenacht, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/417,286

(22) PCT Filed: Jun. 28, 2013

(86) PCT No.: PCT/EP2013/063624
§ 371 (c)(1),
(2) Date: Jan. 26, 2015

(87) PCT Pub. No.: WO2014/019779
PCT Pub. Date: Feb. 6, 2014

(65) Prior Publication Data
US 2015/0247747 A1 Sep. 3, 2015

(30) Foreign Application Priority Data

Jul. 30, 2012 (DE) .......................... 10 2012 106 926

(51) Int. Cl.
*G01F 1/58* (2006.01)
*G01F 1/60* (2006.01)
(52) U.S. Cl.
CPC . *G01F 1/588* (2013.01); *G01F 1/60* (2013.01)
(58) Field of Classification Search
USPC .......................................... 73/861.13, 861.14
See application file for complete search history.

(56) References Cited

U.S. PATENT DOCUMENTS

| 4,010,644 A | 3/1977 | Bonfig |
| 4,676,112 A | 6/1987 | Uematsu |

(Continued)

FOREIGN PATENT DOCUMENTS

| DE | 2410407 | 9/1975 |
| DE | 3815190 A1 | 11/1989 |

OTHER PUBLICATIONS

International Search Report, EPO, The Netherlands, Jan. 28, 2014.

(Continued)

*Primary Examiner* — Jewel V Thompson
(74) *Attorney, Agent, or Firm* — Bacon & Thomas, PLLC

(57) ABSTRACT

A measuring electronics serves for ascertaining a potential difference ($\Delta\phi_{12}$) between a first measuring electrode and a second measuring electrode. For such purpose, the measuring electronics comprises a reference electrode, an input circuit having two circuit inputs electrically connectable with the first, respectively second, measuring electrodes and two signal voltage outputs, a compensation circuit, a measuring and control circuit having two signal voltage inputs, two signal voltage inputs electrically and a compensation control output. The compensation circuit is adapted to provide on the first compensation voltage output a compensation voltage, namely an adjustable direct voltage referenced to the reference potential, and on the second compensation voltage output a compensation voltage, namely a direct voltage referenced to the reference potential. Additionally, the compensation circuit includes at least two operating modes selectable by means of a compensation control signal appliable on the control signal input, wherein in a first operating mode the compensation voltage is set at a predetermined voltage value, and in a second operating mode the compensation voltage is set at a predetermined voltage value. The measuring and control circuit, in turn, is adapted to provide on the compensation control output a compensation control signal for selecting one of the selectable operating modes of the compensation circuit.

55 Claims, 4 Drawing Sheets

(56) References Cited

U.S. PATENT DOCUMENTS

| | | |
|---|---|---|
| 4,704,908 A | 11/1987 | Blatter |
| 4,723,449 A | 2/1988 | Tiley |
| 4,953,409 A | 9/1990 | Marchewka |
| 5,907,103 A | 5/1999 | Budmiger |
| 6,708,569 B2 | 3/2004 | Budmiger |
| 2005/0125168 A1 | 6/2005 | Brockhaus |
| 2010/0231294 A1 | 9/2010 | Bier |

OTHER PUBLICATIONS

German Search Report, German PTO, Munich, DE, Apr. 5, 2013.
English Translation of the International Preliminary Report on Patentability, WIPO, Geneva, CH, Feb. 12, 2015.

MEASURING ELECTRONICS AS WELL AS MEASURING SYSTEM FORMED THEREWITH

TECHNICAL FIELD

The invention relates to a measuring electronics, especially a measuring electronics suitable for application in a magneto inductive flow measuring device, for ascertaining a potential difference (especially a potential difference dependent on a volume flow rate of a flowing liquid exposed to a temporarily constant magnetic field) between two measuring electrodes having electrical potentials deviating from one another, wherein the potential difference has a time variable, wanted component as well as a disturbance component superimposed thereon. Furthermore, the invention relates to a measuring system formed by means of such a measuring electronics, especially a magneto inductive, flow measuring device.

BACKGROUND DISCUSSION

Measuring electronics of the type being discussed are described, for example, in German Patents, DE-C 197 16 119, and DE-C 197 16 151, European Patent EP-A 027 181, and U.S. Patents, US-A 2002/0145417, US-A 2005/0125168, US-A 2010/0231294, U.S. Pat. No. 4,382,387, U.S. Pat. No. 4,704,908, U.S. Pat. No. 6,693,486, U.S. Pat. No. 6,708,569 or U.S. Pat. No. 8,174,312 and comprise most often an input circuit formed by means of impedance converters for the largely electrical currentless, consequently as reaction free as possible, tapping of potentials formed on the two measuring electrodes, wherein a first circuit input is electrically connected with a first of the measuring electrodes and a second circuit input is electrically connected with a second of the measuring electrodes.

The input circuit—embodied for the purpose of high common-mode suppression, for example, as a difference amplifier amplifying the potential difference proportionally, in given cases, also full differentially—such as described e.g. in U.S. Pat. No. 6,693,486 or U.S. Pat. No. 8,174,312—delivers either on a signal output an analog measurement voltage referenced to a reference potential of the apparatus, for example, ground, as a direct measure for the potential difference or on a first signal voltage output a first signal voltage referenced to a reference potential and dependent on the electrical potential on the first measuring electrode and on a second signal voltage output a second signal voltage referenced to the mentioned reference potential and dependent on the electrical potential on the second measuring electrode. The input circuit is connected output side, in each case, with a measuring and control circuit of the apparatus. The measuring and control circuit is embodied most often as a microcomputer and serves, among other things, either to convert the measurement voltage analogly representing the potential difference or the two separate signal voltages into a digital voltage measurement signal representing the potential difference existing between the two measuring electrodes.

Such measuring electronics are used not least of all in magneto inductive measuring transducers, consequently in magneto inductive, flow measuring devices formed therewith, so-called MID, namely for measuring a potential difference, which is dependent on a volume flow rate of a flowing liquid exposed to a magnetic field alternating with predetermined frequency typically lying between 25 Hz and 100 Hz, consequently a time variable, magnetic field. Such MID measuring systems for flowing liquid have been known for a long time and are described comprehensively not least of all also in the patent literature, for example, in the above mentioned German Patents, DE C 197 16 119, and DE-C 197 16 151, European Patent, EP-A 027 181, and U.S. Patents, US-A 2002/0145417, US-A 2005/0125168, US-A 2010/0231294, U.S. Pat. No. 4,382,387, U.S. Pat. No. 4,704,908, U.S. Pat. No. 6,708,569, and U.S. Pat. No. 6,693,486.

Usually, such MID devices, especially industrial grade MID devices, are provided as pre-fabricated measuring systems, wherein both the mutually spaced measuring electrodes as well as also a magnetic field generator are arranged on a measuring tube serving for guiding a flowing liquid and lined internally with an insulating layer, the so-called liner. The measuring electrodes are here so installed that their electrical potentials depend on electrical voltages arising in a liquid guided in the measuring tube, for example, electrical voltages arising due to charge carrier shifting within the liquid. Typically, the measuring electrodes are arranged on the measuring tube spaced from one another along an imaginary, peripheral line of the measuring tube, especially a circularly shaped, peripheral line, defining a cross sectional area of the measuring tube, and most often also lie on one and the same diameter of said measuring tube.

The magnetic field generator is provided to produce the mentioned magnetic field during operation of the MID, and, indeed, in such a manner that the magnetic field passes through the lumen of the measuring tube at least partially also within a region extending between the measuring electrodes, namely with a wanted magnetic field component extending perpendicularly to an imaginary connecting axis imaginarily connecting the two measuring electrodes and influencing the wanted component of the potential difference. The measuring electrodes can be embodied, for example, as galvanic measuring electrodes, namely measuring electrodes, in each case, protruding with an electrode tip into a lumen of the measuring tube, respectively contactable by a liquid guided therein, or, for example, also as capacitive measuring electrodes embedded in the liner.

Since the MID used in industrial measurements technology, such as already mentioned, not least of all also for the purpose of enabling a compensation of electrochemical disturbance potentials on the measuring electrodes, are operated usually with magnetic fields of periodically changing magnetic field direction, in such a manner that the magnetic field direction of the wanted component of the magnetic field changes periodically with a predeterminable frequency, the corresponding magnetic field generators are controlled most often by means of a magnetic field control signal generated by the measuring and evaluating circuit, predetermined by a corresponding clock signal—, for example, also a periodically clocked and/or binary signal—, in such a manner that a magnetic field is produced, which changes, in time, as a function of the magnetic field control signal.

The potential difference to be registered contains a time variable, wanted component, whose instantaneous voltage values are dependent on an instantaneous magnitude of the measured variable to be registered and are, consequently, variable in time. In the case of applying the measuring electronics in a MID, this happens as a result of interaction of the magnetic field with the flowing liquid and therein induced charge shifts (magneto hydrodynamic effect, Faraday induction). In the case of a magnetic field clocked in the described manner, the wanted component additionally also changes its polarity in time with the alternation of the magnetic field.

In the case of modern MID, the measuring and control circuit is typically embodied as a microcomputer, first of all, analog-to-digitally converting and thereafter digitally evaluating the potential difference, namely as a measuring and control circuit, which is adapted to convert a voltage difference existing between the two signal voltages of the input circuit with a sampling rate higher in comparison to the clocking rate for the magnetic field and with a digital resolution of some bits, nominally most often 16 or 24 bit, into a digital voltage measurement signal representing the voltage difference, thus, selected from a predetermined, stepped collection, a sequence of digital values, each of which represents lying within a predetermined conversion range a quantized measured value for a potential difference dependent on the voltage difference.

In the case of MID for industrial measurements technology, such as used, for example, for measuring the volume flow rate of liquids flowing in pipelines, liquids having often only a low electrical conductivity of less than 1000 µS/cm (microsiemens per centimeter), such as e.g. drinking water or waste water, the measurement voltage range extends regularly only over less than 1 mV, especially in the case of medium flow velocity fluctuating within a broad nominal measurement range for the flow velocity of $0.1 \cdot 10^{-3}$ to 10 m/s (meters per second), consequently in a dynamic range (relative measuring range) of 1:10000. As a result of this, the wanted component can have, at times, a minimum (consequently metrologically just still resolvable) voltage value, which lies in the order of magnitude of less than 10 nV (nanovolt).

As discussed, among other things, in the above cited U.S. Pat. No. 4,704,908 or US-A 2005/0125168, the potential difference contains—for instance, as a result of electrochemical processes in the region of the one or the other measuring electrode, respectively associated therewith, charge concentrations varying unpredictably in time in the region of the respective measuring electrode—always additionally also a disturbance component, which is, most often, over a time period longer in comparison to the alternation of the magnetic field, constant in time, respectively changes slowly in comparison to the clocking rate, with which the wanted component changes in time. This disturbance component can vary within a voltage range much greater than the actual measurement voltage range corresponding to the fluctuation of the wanted component. For instance, the disturbance voltage can lie between −2 V (volt) and +2 V, consequently a multiple of the voltage range equaling the nominal measurement range. Without corresponding measures, there results, thus, a resolution theoretically to be provided by means of the aforementioned measuring circuit, namely by its analog-to-digital converters performing the actual conversion. This resolution, with which the potential difference is to be converted into the digital voltage measurement signal, must be greater than $\log_2(2\,V/10\,nV)$, respectively greater than 27 bit. Moreover, the theoretically to be provided resolution increases further as a result of the linearity error regularly present in actual analog-to-digital converters, respectively as a result of the relatively high input amplification (due to the high sensitivity strived for) of the signal voltages representing the potential difference, including disturbance component.

Thus, there are requirements in this context as regards resolution, such as could be provided by measuring electronics of the type being discussed, especially also electronics such as would be applied in MID, which clearly lie above the 24 bit nominal maximum resolution provided by typically used analog-to-digital converters, respectively the bounded nominal resolution of these analog-to-digital converters requires conversely, for the purpose of preventing a considerable reduction of the desired measuring dynamic and/or the desired accuracy of measurement, special measures in the signal processing preceding the A/D conversion.

For preventing, respectively reducing, the proportion of the disturbance component in the analog voltages supplied to the measuring-control circuit for further processing, the above cited U.S. Pat. No. 4,704,908 describes, for example, a clock controlled supplying of an analog measurement voltage proportional to the potential difference at the output of an input circuit formed as a difference amplifier with a compensation voltage opposite equal to the instantaneous disturbance component, thus virtually completely eliminating such from the analog measurement voltage. In order, on the one hand, to be able to register the disturbance component as exactly as possible and, on the other hand, correspondingly to readjust the compensation voltage as exactly as possible, as well as quickly as possible, however, very complex compensation circuits, respectively methods, are required, with the result that the accuracy and dynamic range, with which the compensation voltage is actually set enters directly into the accuracy, respectively the dynamic range, with which the measuring of the actual measured variable—for example, thus the volume flow rate—can occur.

Another approach to a solution aims, furthermore, to eliminate or at least mentionably to lessen the disturbance component before the actual tapping of the potential difference. Thus, it is provided in US-A 2005/0125168, for example, that the potential of the liquid is changed in a manner reducing the disturbance component by suitably controlling, namely correspondingly increasing or decreasing, by means of a control circuit an electrical potential of a reference electrode of the measuring tube. Alternatively thereto, U.S. Pat. No. 6,708,569 aims to reduce, respectively to eliminate, the disturbance component by supplying the measuring electrodes with a corresponding, in such case, pulsed, compensation voltage. Viewed as disadvantageous in the case of these approaches to a solution is, however, especially the circumstance that the resulting voltages within the liquid, respectively between the measuring electrodes, must be influenced without knowing the charge distribution actually reigning instantaneously between the measuring electrodes exactly enough. Thus, the electrochemical processes naturally running within the measuring tube must be uncontrollably interfered with.

SUMMARY OF THE INVENTION

Based on the above discussion, an object of the invention is to improve measuring circuits of the aforementioned type, not least of all also those applied in MID, such that, on the one hand, a simple, equally as well effective, compensating of the disturbance component of potential differences tappable largely currentlessly from liquids and, indeed, without mentionable influence of electrochemical processes within the liquid guided between the measuring electrodes, can be performed. On the other hand, the invention should also effectively enable a digitizing of wanted components contained in potential differences of the type being discussed with a high resolution, which is, in comparison with the respective disturbance components, typically extremely small, e.g. less than 10 nV/bit.

For achieving the object, the invention resides in a measuring electronics for ascertaining between a first measuring electrode having a first electrical potential and a second measuring electrode having a second electrical potential a potential difference, for example, a potential difference dependent on a volume flow rate of a flowing liquid exposed to a magnetic field, wherein the potential difference contains a time variable, wanted component, for example, one varying with a predetermined frequency, wherein the wanted component is less than a maximum voltage value predetermined therefor and greater than a minimum voltage value predetermined therefor, and wherein the potential difference contains a disturbance component, which is constant in time, respectively changes more slowly than the wanted component, for example, in comparison with a frequency, with which the wanted component changes with time, wherein the disturbance component is less than a maximum voltage value predetermined therefor and greater than a minimum voltage value predetermined therefor, and wherein the maximum voltage value of the disturbance component is greater than the maximum voltage value predetermined for the wanted component and the minimum voltage value of the disturbance component is less than the minimum voltage value predetermined for the wanted component. For such purpose, the measuring electronics comprises:

a reference electrode having a reference potential, for example, a fixed reference potential, an input circuit having a first circuit input formed by means of a non-inverting input of a first impedance converter and electrically connectable with the first measuring electrode, a second circuit input formed by means of a non-inverting input of a second impedance converter and electrically connectable with the second measuring electrode, a first signal voltage output formed by means of an output of the first impedance converter, and a second signal voltage output formed by means of an output of the second impedance converter, a compensation circuit having a first compensation voltage output, a second compensation voltage output, and a control signal input, as well as a measuring and control circuit having a first signal voltage input connected with the first signal voltage output of the input circuit, a second signal voltage input electrically connected with the second signal voltage output of the input circuit, a third signal voltage input electrically connected with the first compensation voltage output of the compensation circuit, a fourth signal voltage input electrically connected with the second compensation voltage output of the compensation circuit, and a compensation control output connected with the control signal input of the compensation circuit.

in the case of the measuring electronics of the invention:

the input circuit is additionally adapted to provide on the first signal voltage output a first signal voltage referenced to the reference potential and dependent on the first electrical potential and on the second signal voltage output a second signal voltage referenced to the reference potential and dependent at least on the second electrical potential, for example, in such a manner that a voltage difference between the first signal voltage and the second signal voltage corresponds to a predetermined multiple of the potential difference and/or less than 5-times the potential difference, the compensation circuit is adapted to provide on the first compensation voltage output a first compensation voltage, namely an adjustable first direct voltage referenced to the reference potential, and on the second compensation voltage output a second compensation voltage, namely a second direct voltage referenced to the reference potential, for example, an adjustable or fixed, second direct voltage, for example, in such a manner that between the first compensation voltage and the second compensation voltage a voltage difference corresponds to greater than 25% of an instantaneous voltage value of the disturbance component, and the measuring and control circuit is adapted to convert a voltage difference between a first compensated signal voltage dependent on both the first signal voltage as well as also the first compensation voltage, and a second compensated signal voltage dependent on both the second signal voltage as well as also the second compensation voltage using a predeterminable—, for example, in comparison to the frequency, with which the wanted component changes, higher—, sampling rate and a, for example, greater than 16 bit, digital resolution into a digital voltage measurement signal representing the voltage difference, namely a sequence of digital values selected from a predetermined, stepped collection and each representing a quantized measured value of the voltage difference and lying within a predetermined conversion range.

The compensation circuit of the measuring electronics of the invention includes at least two operating modes selectable by means of a compensation control signal appliable on the control signal input and is, furthermore, adapted in a first operating mode to set the first compensation voltage at a first voltage value predetermined therefor and in a second operating mode to set the first compensation voltage at a second voltage value predetermined therefor, which is greater than the first voltage value predetermined for the first compensation voltage, while the measuring and control circuit of the measuring electronics of the invention is, furthermore, adapted to provide on the compensation control output a compensation control signal for selecting one of the selectable operating modes of the compensation circuit, namely in such a manner that the compensation control signal has for selecting the first operating mode of the compensation circuit a first signal value corresponding to the first operating mode of the compensation circuit, respectively that the compensation control signal has for selecting the second operating mode of the compensation circuit a second signal value corresponding to the second operating mode of the compensation circuit and different from the first signal value.

Moreover, the invention resides in a measuring system for ascertaining a volume flow rate and/or a flow velocity of a flowing liquid, for example, a liquid exposed to a temporarily constant magnetic field and/or flowing in a pipeline, which measuring system comprises such a measuring electronics, a measuring tube for guiding the liquid, as well as arranged spaced from one another on the measuring tube, for example, in each case, protruding with an electrode tip into a lumen of the measuring tube, two measuring electrodes, of which a first measuring electrode is connected with the first circuit input of the input circuit and a second measuring electrode is connected with the second circuit input of the input circuit.

In a first embodiment of the measuring electronics of the invention, it is, furthermore, provided that the digital resolution, with which the voltage difference is converted into the digital voltage measurement signal, amounts to greater than 20 bit.

In a second embodiment of the measuring electronics of the invention, it is, furthermore, provided that the measuring and control circuit is, furthermore, adapted to set the compensation control signal to the first signal value corresponding to the first operating mode of the compensation circuit and thereafter to compare at least one digital value of first type, namely a digital value of the digital voltage measurement signal generated while the first operating mode of the compensation circuit is selected with at least one predetermined, first reference value, for example, corresponding to a predetermined minimum value for a measured value of the voltage difference. Developing this embodiment of the invention further, it is, additionally, provided that the measuring and control circuit is adapted to detect a subceeding of the first reference value, $U_{r1}$, by the digital value of first type and thereafter for increasing the voltage difference, for example, to a measured value, which is greater than a minimum value predetermined therefor, to set the compensation control signal to the second signal value corresponding to the second operating mode of the compensation circuit, thus to select the second operating mode of the compensation circuit. Furthermore, the measuring and control circuit can also be adapted to compare at least one digital value of second type, namely a digital value of the digital voltage measurement signal generated while the second operating mode of the compensation circuit is selected, with a predetermined, second reference value, $U_{r2}$, for example, corresponding to a predetermined maximum value for a measured value of the voltage difference, for example, also in such a manner that the measuring and control circuit, in case it detects an exceeding of the second reference value by the digital value of second type, for lessening the voltage difference, for example, to a measured value, which is less than a maximum value predetermined therefor, sets the compensation control signal to the first signal value corresponding to the first operating mode of the compensation circuit.

In a third embodiment of the measuring electronics of the invention, it is, additionally, provided that the compensation circuit and the measuring and control circuit are adapted to set the voltage difference to less than a maximum value predetermined therefor, for example, to less than +5 V, and/or to greater than a minimum value predetermined therefor, for example, greater than −5 V, for example, thus to keep the voltage difference within the predetermined conversion range of the measuring and control circuit. Developing this embodiment of the invention further, it is, additionally, provided that the maximum value corresponds to an upper boundary of the conversion range and the minimum value to a lower boundary of the conversion range and/or that the conversion range corresponds to a difference between the maximum value and the minimum value.

In a fourth embodiment of the measuring electronics of the invention, it is, additionally, provided that the compensation circuit and the measuring and control circuit are adapted to keep the voltage difference within the predetermined conversion range of the measuring and control circuit.

In a fifth embodiment of the measuring electronics of the invention, it is, additionally, provided that the measuring and control circuit is adapted to produce a measurement voltage representing the voltage difference, for example, in such a manner that the measurement voltage is less than a maximum voltage value predetermined therefor, for example, less than +5 V, and/or greater than a minimum voltage value predetermined therefor, for example, greater than −5V, and/or that the measurement voltage lies within a predetermined measurement voltage range, which is less than 5V. Developing this embodiment of the invention further, it is, additionally, provided that the measuring and control circuit is adapted to output the measurement voltage as a multiple of the voltage difference of the voltage difference and/or that the measuring and control circuit has a subtractor, for example, one formed by means of a positive feedback, difference amplifier, having an inverting signal input, a non-inverting signal input and a measurement voltage output, which subtractor can be adapted, for example, to provide the measurement voltage on the measurement voltage output.

In a sixth embodiment of the measuring electronics of the invention, it is, additionally, provided that the measuring and control circuit has a subtractor formed, for example, by means of a positive feedback, difference amplifier, having an inverting signal input, a non-inverting signal input and a measurement voltage output and that the first and third signal voltage inputs of the measuring and control circuit are formed by means of the non-inverting signal input of the subtractor and the second and fourth signal voltage inputs of the measuring and control circuit are formed by means of the inverting signal input of the subtractor.

In a seventh embodiment of the measuring electronics of the invention, it is, additionally, provided that the measuring and control circuit has an analog-to-digital converter with an analog signal input and with a digital signal output, wherein the analog-to-digital converter is clocked with the sampling rate and has a nominal resolution of, for example, greater than 16 bit. Developing this embodiment of the invention further, it is, additionally, provided that the analog-to-digital converter has a nominal resolution of 24 bit.

In an eighth embodiment of the measuring electronics of the invention, it is, additionally, provided that the measuring and control circuit has a subtractor formed, for example, by means of a positive feedback, difference amplifier, having an inverting signal input, a non-inverting signal input and a measurement voltage output, as a well as an analog-to-digital converter with an analog signal input and with a digital signal output, wherein the analog to digital converter is clocked with the sampling rate and has, for example, a nominal resolution of greater than 16 bit, and that the analog signal input of the analog-to-digital converter is electrically connected with the measurement voltage output of the subtractor and the analog-to-digital converter is adapted to provide the digital voltage measurement signal on the digital signal output.

In a ninth embodiment of the measuring electronics of the invention, it is, additionally, provided that the compensation circuit is adapted in the first operating mode to set the second compensation voltage at a first voltage value predetermined therefor, which is greater than the first voltage value of the first compensation voltage, and/or that the compensation circuit is adapted in the second operating mode to set the second compensation voltage at a second voltage value predetermined therefor, which is less than the second voltage value of the first compensation voltage. Developing this embodiment of the invention further, it is, additionally, provided that the compensation circuit is adapted in the first operating mode to set the second compensation voltage to the voltage value and in the second operating mode to set the second compensation voltage to the voltage value, in such a manner that a compensation voltage difference, namely a voltage difference set between the first compensation voltage and the second compensation voltage, assumes in the first operating mode a voltage value, which is different from a voltage value, which the compensation voltage difference assumes in the second operating mode.

In a tenth embodiment of the measuring electronics of the invention, it is, additionally, provided that the compensation circuit has a—first—digital-to-analog converter having a digital signal input, for example, receiving the control signal of the measuring and control circuit and/or forming the control signal input of the compensation circuit, and an analog signal output, for example, delivering the first compensation voltage and/or forming the first compensation voltage output. Developing this embodiment of the invention further, it is, additionally, provided that the first compensation voltage output of the compensation circuit is formed by means of the analog signal output of the digital-to-analog converter, for example, in that the analog signal output of the digital-to-analog converter is electrically connected with the first signal voltage output of the input circuit with interpositioning of at least one resistance element and/or that the digital-to-analog converter is adapted to set the first compensation voltage, for example, in that a direct voltage set on its analog signal output drives a compensation electrical current through at least one resistance element electrically connected with the analog signal output. Alternatively thereto or in supplementation thereof, the control signal input of the compensation circuit can also be formed by means of the digital signal input on the digital-to-analog converter and/or the digital-to-analog converter can also be adapted to provide on its analog signal output a variable direct voltage dependent on the control signal and serving as compensation voltage. Moreover, the compensation circuit can, furthermore, have an additional—second—digital-to-analog converter having, for example, a digital signal input receiving the control signal from the measuring and control circuit and/or forming the control signal input of the compensation circuit, and having, for example, an analog signal output delivering the second compensation voltage and/or forming the second compensation voltage output.

In an eleventh embodiment of the measuring electronics of the invention, it is, additionally, provided that the input circuit is adapted such that the first signal voltage on the first signal voltage output depends also on the second signal voltage on the second signal voltage output and the second signal voltage on the second signal voltage output depends also on the first signal voltage on the first signal voltage output, for example, in such a manner that a voltage difference between the first signal voltage and the second signal voltage is proportional to the potential difference.

In a first further development of the measuring electronics of the invention, such further comprises a power supply circuit, which is adapted to provide an operating voltage, for example, an operating voltage controlled at a voltage value predetermined therefor and/or a constant voltage value, for supplying the input circuit, the compensation circuit as well as the compensation circuit.

In a first embodiment of the measuring system of the invention, it is, furthermore, provided that the measuring electrodes are adapted such that their respective electrical potentials depend on electrical voltages arising in a liquid guided in the measuring tube, for example, electrical voltages caused by charge carrier shifting within the liquid.

In a second embodiment of the measuring system of the invention, it is, furthermore, provided that the measuring electrodes are arranged spaced from one another on the measuring tube along an imaginary peripheral line on the measuring tube, for example, a circularly shaped peripheral line and/or a peripheral line surrounding a cross sectional area of the measuring tube.

In a third embodiment of the measuring system of the invention, it is, furthermore, provided that each of the measuring electrodes is contactable by a liquid guided in the measuring tube.

In a fourth embodiment of the measuring system of the invention, it is, furthermore, provided that the measuring and control circuit is adapted to generate by means of the digital voltage measurement signal a sequence of measured values of flow instantaneously representing the volume flow rate. Developing this embodiment of the invention further, it is, additionally, provided that the measuring and control circuit is adapted to generate by means of the digital voltage measurement signal a voltage difference sequence, namely a sequence of digital values, each of which represents a difference between two time-sequential digital values of the digital voltage measurement signal, especially in such a manner that the measuring and control circuit, furthermore, is also adapted not to generate a difference between digital values representing digital values of the digital voltage measurement signal generated during different operating modes of the compensation circuit. Alternatively thereto or in supplementation thereof, the measuring and control circuit is, furthermore, adapted to generate by means of the voltage difference sequence the sequence of measured values of flow instantaneously representing the volume flow rate, especially in such a manner that the measuring and control circuit does not use such digital values of the voltage difference sequence in the case of ascertaining a measured value of flow, when the digital values represent a difference between digital values of the digital voltage measurement signal generated during different operating modes of the compensation circuit.

In a first further development of the measuring system of the invention, such additionally comprises a magnetic field generator having a control signal input, wherein the magnetic field generator is adapted to produce at least partially passing through a lumen of the measuring tube, for example, also within a region extending between the measuring electrodes, a magnetic field, which changes as a function of a magnetic field control signal appliable to the control signal input, for example, in such a manner that the magnetic field has, extending perpendicularly to an imaginary connecting axis imaginarily connecting the two measuring electrodes and influencing the wanted component of the potential difference, a wanted component having a magnetic field direction periodically changing with a frequency. In an embodiment of this further development of the measuring system of the invention, the measuring and control circuit of the measuring electronics includes a magnetic field control signal output connected with the control signal input of the magnetic field generator and the measuring and control circuit is adapted to provide on the magnetic field control signal output a magnetic field control signal, for example, a periodically alternating, magnetic field control signal. Developing this embodiment of the invention further, it is, additionally, provided that the magnetic field control signal is embodied as a rectangular signal and/or that the magnetic field control signal effects an alternating, for example, periodic, change of the magnetic field produced by the magnetic field generator, for instance, in such a manner that the wanted component of the magnetic field has a magnetic field direction changing with a periodic frequency. Accordingly, the measuring and control circuit can also be adapted to output the magnetic field control signal as a rectangular signal alternating periodically with a frequency.

A basic idea of the invention is to enable a highly resolved digitizing of the wanted components of potential differences of the type being discussed, namely with a resolution as much as possible less than 10 nV/bit, even using A/D converters, which have comparatively low nominal resolution of 24 bit or less, respectively to enable measuring and control circuits formed therewith, by features including that, on the one hand, each of two signal voltages derived from the potentials to be measured is changed by means of a respectively superimposed compensation voltage to the extent that, as a result, a voltage difference containing the original wanted component contains only a reduced disturbance component matched to the nominal conversion range of the measuring and control circuit, for example, having an effective conversion range formed by means of a 24 bit A/D converter, consequently of only less than $2^{24} \cdot 10$ nV, and that, on the other hand, the particular compensation voltage is set, in each case, to a voltage value selected from a relatively small number of predetermined discrete voltage values, for example, only $2^0$, $2^1$ or $2^3$.

The respectively newly to be set voltage value can, in such case, ideally be so selected that, as a result, the currently to be converted voltage difference has a voltage value, which corresponds as exactly as possible to half of the conversion range of the A/D converter. Consequently, for updated digitizing of the wanted component, which changes, in comparison to the disturbance component, potentially very quickly, respectively over a broad measurement voltage, respectively dynamic, range, almost half the conversion range of the A/D converter can be utilized. Due to the fact that the disturbance component changes in comparison to the wanted component most often only relatively slowly, the voltage value set for the particular compensation voltage can interimly, in each case, be left alone over a comparatively long time span (>1 s), respectively one can wait with the setting of a new voltage value correspondingly long, for example, until the voltage difference assumes a voltage value, which corresponds, for instance, to a fourth or three fourths of the conversion range of the A/D converter, respectively of the measuring and control circuit formed therewith.

The invention as well as other advantageous embodiments and utilities thereof will now be explained in greater detail based on examples of embodiments presented in the figures of the drawing. Equal parts are provided in all figures with equal reference characters; when perspicuity requires or it otherwise appears sensible, already presented reference characters are omitted in subsequent figures. Other advantageous embodiments or further developments, especially also combinations, of firstly, only individually explained aspects of the invention, will become evident, furthermore, from the figures of the drawing, as well as also from the dependent claims per se.

DETAILED DISCUSSION IN CONJUNCTION WITH THE DRAWINGS

Figure 1:
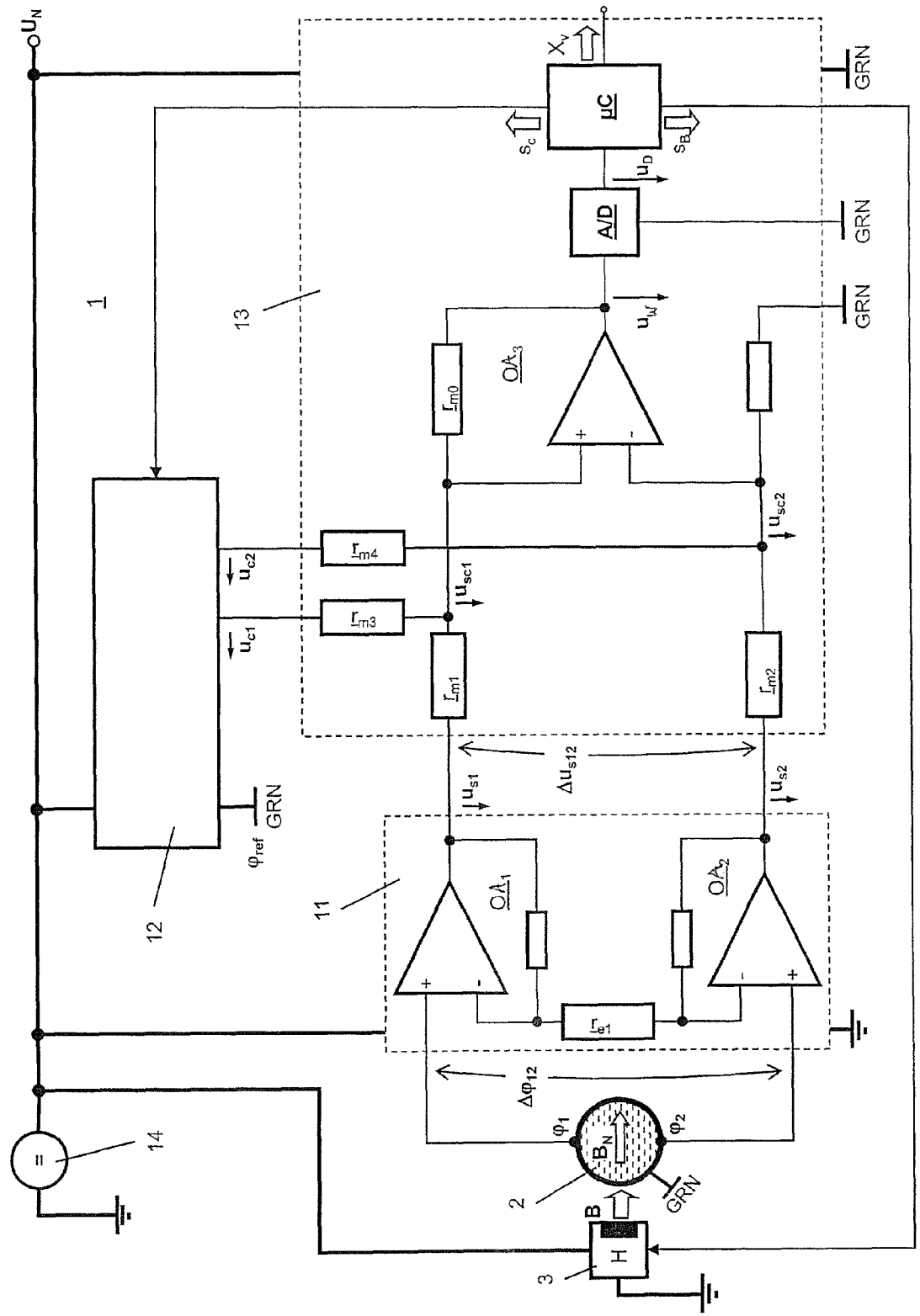
FIG. 1 shows schematically in the manner of a block diagram, an example of an embodiment of a measuring electronics of the invention having a compensation circuit, respectively a measuring system formed therewith.

FIG. 1 shows schematically an example of an embodiment of a measuring electronics 1 for ascertaining a potential difference $\Delta\phi_{12}$ between a first measuring electrode having a first electrical potential $\phi_1$ and a second measuring electrode having a second electrical potential $\phi_2$. The potential difference $\Delta\phi_{12}$ to be ascertained includes a time variable, wanted component $\Delta\phi_W$, for example, one corresponding to a physical, measured variable to be registered for a liquid flowing in a line, as well as an, at times, also time variable, disturbance component $\Delta\phi_d$, for example, one caused by electrochemical processes at an interface between the liquid and the measuring electrodes. For explaining the invention, it is assumed that the disturbance component $\Delta\phi_d$ occurs at the same time as the wanted component $\Delta\phi_W$, consequently it is superimposed on the latter, in such a manner that the wanted component $\Delta\phi_W$ is less than an application related, maximum voltage value, $\Delta\phi_{WMAX}$, predetermined therefor, for example, lying at, for instance, +1 mV, and greater than an application related minimum voltage value, $\Delta\phi_{WMIN}$, predetermined therefor, for example, lying at, for instance, −1 mV, and that the disturbance component $\Delta\phi_d$ is less than an application related, maximum voltage value, $\Delta\phi_{dMAX}$, predetermined therefor, which is greater than the predetermined maximum voltage value, $\Delta\phi_{WMAX}$, of the wanted component $\Delta\phi_W$, for example, can lie namely, for instance, at $\Delta\phi_{dMAX}$=+2 V and greater than an application related minimum voltage value, $\Delta\phi_{dmiN}$, predetermined therefor, which is less than the predetermined minimum voltage value, $\Delta\phi_{WMIN}$, of the wanted component $\Delta\phi_W$, for example, lies namely, for instance, at $\Delta\phi_{WMIN}$=−2 V. Moreover, it can be assumed that the wanted component $\Delta\phi_W$ can regularly assume also voltage values, which lie in the order of magnitude of a few nanovolt, for example, thus in the range ±10 nV. As a result, thus the potential difference $\Delta\phi_{12}$ can have a ratio of disturbance component to wanted component, which can in the extreme case be even greater than 2 V/10 nV. Especially, it can, furthermore, be assumed that the disturbance component $\Delta\phi_d$ does indeed change over time in unpredictable manner within the predetermined fluctuation range, however, significantly slower in comparison to the wanted component, in such a manner that it can, for a certain length of time, be viewed as approximately constant, while the wanted component $\Delta\phi_W$ changes significantly.

The measuring electronics 1 includes, such as schematically shown in FIG. 1, a power supply circuit 14, which is adapted, on the one hand, to supply further components 11, 12, 13 of the measuring electronics with the electrical energy needed for their operation and, on the other hand, to provide an operating voltage serving as reference for ascertaining the potential difference $\Delta\phi_{12}$, namely a direct voltage, for example, a unipolar or bi-polar, direct voltage, controlled to a voltage value $U_{PS}$ having a nominal value, for example 5 V, predetermined therefor, especially a nominal value, which is as constant as possible.

For registering the potentials $\phi_1$, $\phi_2$ on the two measuring electrodes, the measuring electronics 1 includes, furthermore, an input circuit 11 having a first circuit input electrically connected with the first measuring electrode and a second circuit input electrically connected with the second measuring electrode. The input circuit 11 is provided to deliver on a first signal voltage output a first signal voltage $u_{s1}$ dependent at least on the first electrical potential (pi and referenced to a reference potential $\phi_{Ref}$ applied to a corresponding reference electrode GRN of the measuring electronics carrying, for example, 0.5·$U_{PS}$ and/or 0 volt, and on a second signal voltage output a second signal voltage $u_{s2}$ dependent at least on the second electrical potential $\phi_2$ and likewise referenced to the reference potential $\phi_{Ref}$. For the purpose of providing an as high as possible input resistance for each of the two circuit inputs of the input circuit, the first circuit input is formed by means of a non-inverting input of a first impedance converter $OA_1$, of which an output serves as first signal output of the input circuit, and the second circuit input is formed by means of a non-inverting input of a second impedance converter $OA_2$, of which an output serves as second signal output of the input circuit.

In the example of an embodiment shown here, the two impedance converters $OA_1$, $OA_2$ are supplementally connected together by means of a resistance element $r_{e1}$ electrically connecting the inverting inputs of the two impedance converters to form a difference amplifier having a very good common-mode suppression, namely a common-mode suppression largely independent of the amplification ultimately set therefor. As a result, the input circuit is, indeed, so embodied that the first signal voltage $u_{s1}$ on the first signal voltage output is dependent also on the second signal voltage use on the second signal voltage output and the second signal voltage use on the second signal voltage output is dependent also on the first signal voltage $u_{s1}$ on the first signal voltage output, this being, however, carried out in such a manner that a voltage difference $\Delta u_{s12}$ between the first signal voltage $u_{s1}$ and the second signal voltage use is proportional to the potential difference $\Delta\phi_{12}$ actually of interest, consequently equals a predeterminable multiple $M_1$ of the potential difference $\Delta\phi_{12}$, respectively, in each case, corresponds to the wanted- and disturbance components forming the potential difference $\Delta\phi_{12}$. The amplification $M_1$, with which the input circuit amplifies the potential difference $\Delta\phi_{12}$, is preferably so set that it corresponds to less than 5-times the potential difference $\Delta\phi_{12}$, consequently $M_1<5$.

For further processing and evaluating of the signal voltages generated by means of the input circuit 11, the measuring electronics of the invention 1 further comprises a measuring and control circuit 13 having a first signal voltage input connected with the first signal voltage output of the input circuit and consequently receiving the first signal voltage and a second signal voltage input electrically connected with the second signal voltage output of the input circuit and consequently receiving the second signal voltage.

Moreover, the measuring electronics 1, for the purpose of reducing the disturbance components still contained in the two signal voltages $u_{s1}$, $u_{s2}$ at the output of the input circuit, respectively in their voltage difference $\Delta u_{s12}$, and, indeed, in the same ratio amounting, for example, to 2 V/10 nV relative to the wanted components, as in the potential difference $\Delta\phi_{12}$, comprises a compensation circuit 12 having a first compensation voltage output, which is electrically connected with a third signal voltage input of the measuring and control circuit, and a second compensation voltage output, which is electrically connected with a fourth signal voltage input of the measuring and control circuit 13. The compensation circuit 12 is adapted to provide on the first compensation voltage output a first compensation voltage $u_{c1}$, namely an adjustable first direct voltage referenced to the reference potential $\phi_{Ref}$, and on the second compensation voltage output a second compensation voltage $u_{c2}$, namely a second direct voltage referenced to the reference potential $\phi_{Ref}$, for example, a second direct voltage, which is likewise adjustable or, however, can be a fixed voltage. The compensation voltages $u_{c1}$, $u_{c21}$ delivered by the compensation circuit can, for example, be so selected and set that a summation, $\Sigma u_{c12}=u_{c1}+u_{c2}$, of the two compensation voltages $u_{c1}$, $u_{c2}$ has always a predetermined, constant value of, for example, half the difference between the voltage value $U_{PS}$ set for the operating voltage and the reference potential $\phi_{Ref}$ or, for example, even 0 V.

The measuring and control circuit 13 of the measuring electronics of the invention is adapted, especially, to convert a voltage difference $\Delta u_{12}$ between a first compensated signal voltage $u_{sc1}$ dependent on both the first signal voltage $u_{s1}$ as well as also the first compensation voltage $u_{c1}$, namely a weighted summation of the signal- and compensation voltages, and a second compensated signal voltage $u_{sc2}$ dependent on both the second signal voltage $u_2$ as well as also the second compensation voltage $u_{c2}$, namely a weighted summation of the signal—and compensation voltages, consequently a voltage, $u_{sc1}-u_{sc2}$, proportional to the voltage difference $\Delta u_{s12}$, using a predeterminable sampling rate, fs, and a digital resolution, N,—ideally a digital resolution, N, greater than 16 bit, especially greater than 20 bit—into a digital voltage measurement signal $u_D$ representing the voltage difference $\Delta u_{12}$, thus to generate a sequence of digital values, $U_D$, selected from a predetermined, stepped collection of values, of which each corresponds to a quantized measured value, $U_{12}$, lying within a predetermined conversion range, $\Delta U_{12}$,—amounting, for example, to less than 5 V—and representing the voltage difference $\Delta u_{12}$. In an additional embodiment of the invention, there is provided in the measuring electronics for such purpose an analog-to-digital converter N/D, which is clocked with the sampling rate, fs, and which is adapted to provide the digital voltage measurement signal $u_D$ on a digital signal output. The analog-to-digital converter A/D has preferably a nominal resolution of greater than 16 bit, for example, 24 bit, and can be, for example, ADS1246 of the firm, Texas Instruments, Inc.

In another embodiment of the invention, the measuring and control circuit 13 includes for producing an analog measurement voltage $u_M$ representing the voltage difference $\Delta u_{12}$ a subtractor $OA_3$, for example, a fully differential subtractor and/or, such as schematically presented in FIG. 1, a subtractor formed by means of at least one difference amplifier having a positive feedback resistance element $r_{m0}$. The subtractor includes an inverting signal input "−", a non-inverting signal input "+" and a measurement voltage output for the analog measurement voltage $u_M$. In the example of an embodiment shown here, for the purpose of forming a multi-subtractor for the signal- and compensation voltages $u_{s1}$, $u_{s2}$, $u_{c1}$, $u_{c2}$, the first signal voltage input of the measuring and control circuit 13 is formed by means of the non-inverting signal input of the subtractor as well as a first inlet side resistance element $r_{m1}$ connected thereto, the second signal voltage input of the measuring and control circuit is formed by means of the inverting signal input of the subtractor as well as a second inlet side resistance element $r_{m2}$ connected thereto, the third signal voltage input of the measuring and control circuit is formed by means of the non-inverting signal input of the subtractor as well as a third inlet side resistance element $r_{m3}$ connected thereto, and the fourth signal voltage input of the measuring and control circuit is formed by means of the inverting signal input of the subtractor as well as a fourth inlet side resistance element $r_{m4}$ connected thereto. Preferably, the resistance elements $r_{m1}$, $r_{m2}$, $r_{m3}$, $r_{m4}$ are so sized that an ohmic resistance $R_{m1}$ of the resistance element $r_{m1}$ equals an ohmic resistance $R_{m2}$ of the resistance element $r_{m2}$ and an ohmic resistance $R_{m3}$ of the resistance element $r_{m3}$ equals an ohmic resistance $R_{m4}$ of the resistance element $r_{m4}$.

Furthermore, in the example of an embodiment shown in FIG. 1, the measurement voltage output of the subtractor is electrically connected with an analog signal input of an analog-to-digital converter N/D, so that such receives the measurement voltage $u_M$ for the purpose of digitizing it. In an additional embodiment of the invention, the subtractor is provided, consequently the measuring and control circuit is, furthermore, adapted, to output the measurement voltage $u_M$ as a multiple $M_2$ of (for example, greater than 3-times) the voltage difference $\Delta u_{12}$. A corresponding amplification factor of the subtractor can, for example, be fixedly predetermined or, however, also be stepwise adjustable during measuring operation. This can be done, especially, also in such a manner that the measurement voltage $u_M$ is always less than a maximum voltage value, $U_{MMax}$, predetermined therefor, for example, less than +5 V, respectively always greater than a minimum voltage value, $U_{MMin}$, predetermined therefor, for example, greater than −5V or, for example, even 0 volt, respectively in such a manner that the measurement voltage $u_M$ always lies within a predetermined measurement voltage range, for example, from −5 volt to +5V or from 0 volt to +5V, $\Delta U_M = U_{MMax} - U_{MMin}$. Alternatively to the described "analog" subtractor with downstream analog-to-digital converter A/D, however, for example, also a 2-analog-signal input, for example, also differential, analog-to-digital converter, for example, thus an A/D converter of type AD7793 of Analog Devices, Inc., can be used, which is fed on a first analog signal input the first compensated signal voltage $u_{sc1}$ and on a second analog signal input the second compensated signal voltage $u_{sc2}$ and which delivers on a digital output the digital voltage measurement signal $u_D$ representing the voltage difference $\Delta u_{12}$ as a function of time The compensation circuit 12 of the measuring electronics 1 of the invention is, furthermore, so embodied that it has at least two operating modes selectable by means of a compensation control signal $s_C$ appliable on a control signal input provided therein, in such a manner that the compensation circuit 12 sets namely in a first operating mode the first compensation voltage $u_{c1}$ at a predetermined, first voltage value, $U_{c11}$, and that the compensation circuit in a second operating mode sets the first compensation voltage $u_{c1}$ at a second voltage value predetermined therefor, $u_{c12}$, which is greater than the first voltage value, $U_{c11}$ predetermined for the first compensation voltage $u_{c1}$. In an additional embodiment of the invention, the compensation circuit is, furthermore, adapted to set in the first operating mode the second compensation voltage $u_{c2}$ at a predetermined, first voltage value, $u_{c21}$, which is greater than the first voltage value, $U_{c11}$ of the first compensation voltage $u_{c1}$. Alternatively or supplementally, the compensation circuit can also be adapted to set in the second operating mode the second compensation voltage $u_{c2}$ at a second voltage value, $U_{c22}$, predetermined therefor, which is less than the second voltage value, $U_{c12}$, of the first compensation voltage $u_{c1}$. In an additional embodiment of the invention, the compensation circuit is, furthermore, adapted to set in the first operating mode the second compensation voltage $u_{c2}$ at the voltage value, $U_{c21}$, and in the second operating mode the second compensation voltage $u_{c2}$ at the voltage value, $U_{c22}$, in such a manner that a compensation voltage difference $\Delta u_{c12}$, namely a voltage difference $u_{c1} - u_{c2}$ set between the first compensation voltage $u_{c1}$ and the second compensation voltage $u_{c2}$, assumes in the first operating mode a voltage value $U_{c11} - U_{c21}$, which is different from a voltage value $U_{c12} - U_{c22}$, which the compensation voltage difference $\Delta u_{c12}$ assumes in the second operating mode, for example, also in such a manner that the voltage value $U_{c12} - U_{c22}$ is greater than the voltage value $U_{c11} - U_{c21}$. The compensation circuit 12 is, according to an additional embodiment, furthermore, so designed that a greatest voltage value $\Delta u_{c12MAX}$ for the compensation voltage difference $\Delta u_{c12}$ nominally adjustable therewith and dependent not least of all also on the height of the operating voltage is so selected that the voltage value $\Delta U_{c12MAX}$ as a function of a potentially expected maximum value $\Delta U_{s12MAX}$ for the voltage difference $\Delta u_{s12}$ output by the input circuit 11 fulfills the condition:

$$\Delta U_{c12MAX} \geq \frac{R_{m3} + R_{m4}}{R_{m1} + R_{m2}} \cdot \Delta U_{s12MAX}.$$

The maximum value $\Delta u_{s12MAX}$ for the example of an embodiment shown in FIG. 1 essentially equals the multiple $M_1$ of the maximum voltage value, $\Delta \phi_{dMAX}$, of the disturbance component $\Delta \phi_d$. This is done, not least of all, in order, on the one hand, in the case of given operating voltage $U_{PS}$ to be able to implement an as high as possible amplification $M_1$, with which the input circuit amplifies the potential difference $\Delta \phi_{12}$, namely as much as possible in the order of magnitude of $(U_{PS} - \phi_{Ref})/\Delta \phi_{12}$, and, on the other hand, such that the compensation circuit 12 has only an as small as possible number of operating modes. For the above-described case, in which the resistance elements rail, $r_{m2}, r_{m3}, r_{m4}$ of the measuring and control circuit 13 are so sized that their ohmic resistances are pairwise equal, namely with $R_{m1} = R_{m2}$ and with $R_{m3} = R_{m4}$, then the voltage value $\Delta u_{c12MAX}$ obeys the following relationship:

$$\Delta U_{c12MAX} \geq \frac{R_{m3}}{R_{m1}} \cdot \Delta U_{s12MAX}.$$

With the requirement that the compensation circuit 12 should lastly be adapted such that the compensation voltages provided thereby, respectively the compensation voltage difference $\Delta u_{c12}$ provided thereby, are/is always sufficient to achieve a predetermined degree k of compensation, namely to compensate at least a predetermined percentage fraction of the respective voltage difference $\Delta u_{s12}$, there results accordingly for the resistance elements $r_{m1}, r_{m2}, r_{m3}, r_{m4}$ as a further requirement for the sizing of their ohmic resistances $R_{m1}$, $R_{m2}$, $R_{m3}$, and $R_{m4}$ the relationships:

$$\frac{R_{m1}}{R_{m3}} = \frac{R_{m2}}{R_{m4}} = k \cdot \frac{\Delta U_{s12MAX}}{\Delta U_{c12MAX}}.$$

In an additional embodiment of the invention, the compensation circuit 12, matched to the measuring and control circuit 13, is so adapted that the voltage difference between the first compensation voltage and the second compensation voltage is greater than 25% of an instantaneous voltage value of the disturbance component, consequently a compensation degree k is achieved, which amounts to greater than 0.25, this, especially, also for the case, in which the disturbance component has reached its predetermined maximum voltage value, $\Delta \phi_{dMAX}$, or its predetermined minimum voltage value, $\Delta \phi_{dMIN}$.

The setting of the voltage values $U_{c11}$, $U_{c21}$, respectively $U_{c12}$, $U_{c22}$ . . . , respectively desired for the two compensation voltages $u_{c1}$, $u_{c2}$, namely the voltage values associated with the respectively selected operating modes, can occur, for example, by connecting by means of a number of analog switches $S_{11}$, $S_{21}$, $S_{21}$, $S_{22}$ . . . correspondingly sized resistance elements $r_{c11}$, $r_{c12}$, . . . , respectively $r_{c1M}$, (grouped in the case of the examples of embodiments shown in FIG. 2, respectively 3, into a first resistor network $2R2_1$ for the first compensation voltage $u_{c1}$, respectively into a second resistor network $2R2_2$ for the second compensation voltage $u_{c2}$) selectively either to the voltage value $U_{PS}$ or to the reference potential $\phi_{Ref}$, so that through at least one of the resistance elements of each of the two resistor networks $2R2_1$, $2R2_2$, in each case, a direct current flows and, as a result, on the output of the respective resistor network $2R2_1$, $2R2_2$, in each case, a direct voltage of desired voltage level $U_{c11}$, $U_{c21}$, $U_{c12}$, $U_{c22}$ . . . corresponding, in each case, to a set total resistance, respectively to voltage dividers set therewith, and serving as compensation voltage $u_{c1}$, respectively $u_{c2}$, is provided.

Figure 2:
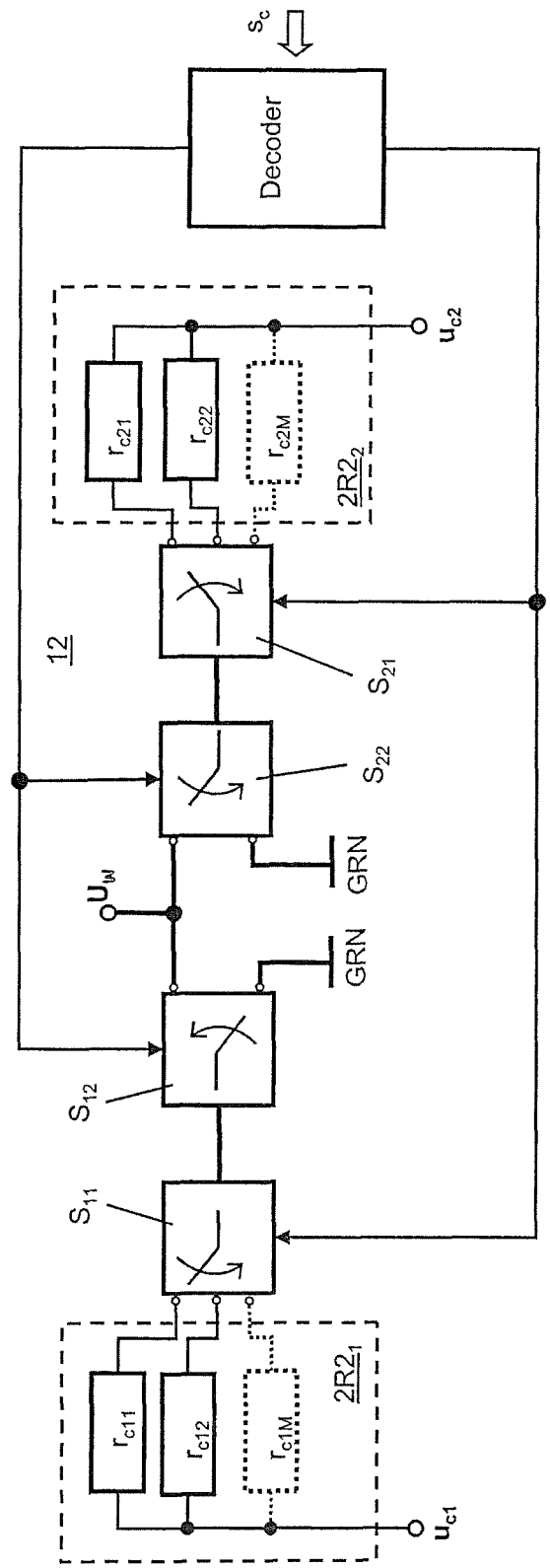
FIG. 2 shows schematically in the manner of a block diagram, a compensation circuit suitable for a measuring electronics, respectively a measuring system, according to FIG. 1.
Figure 3:
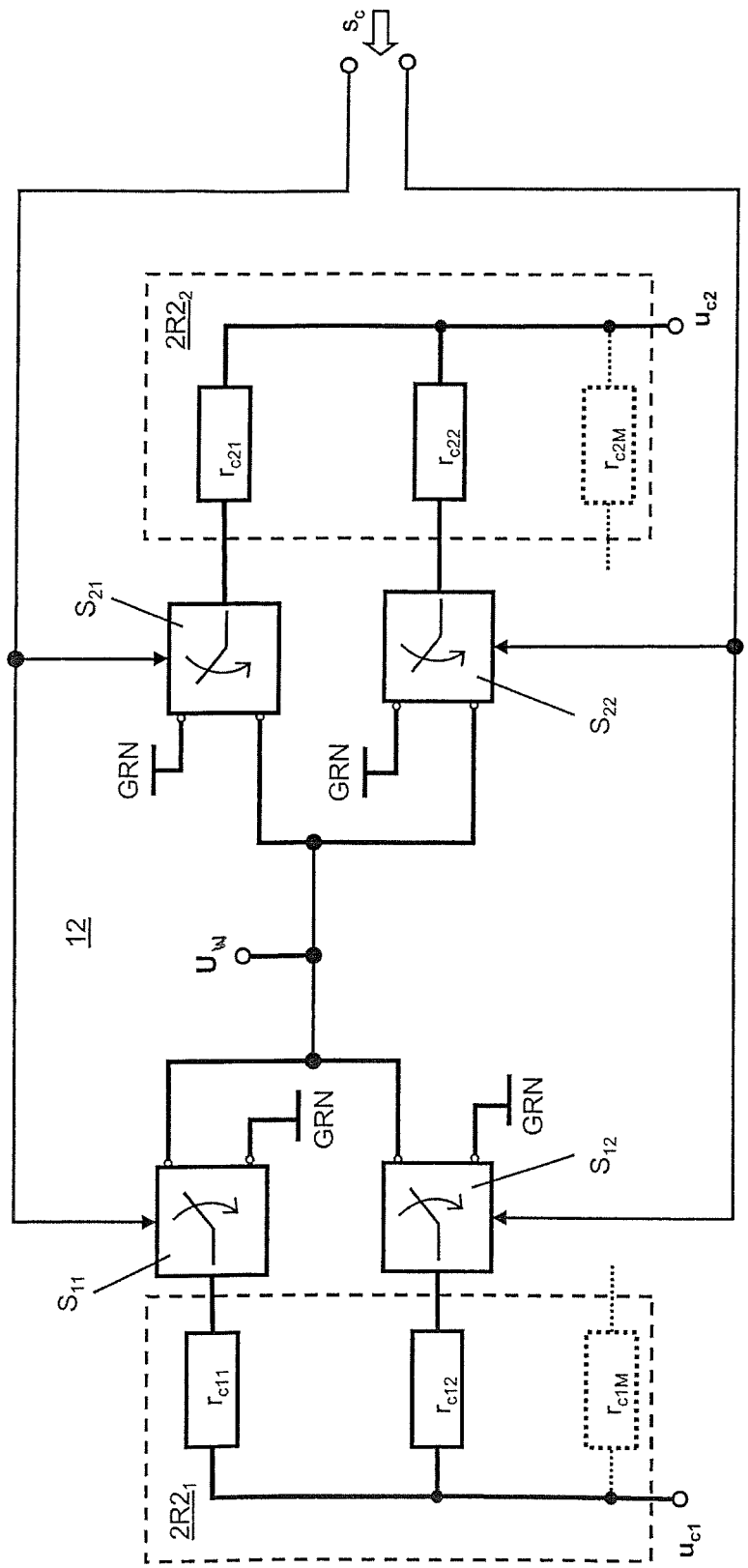
FIGS. 3 and 4 shows schematically in the manner of block diagrams, in each case, another variant of a compensation circuit suitable for a measuring electronics, respectively measuring system, according to FIG. 1.

In other words, in the case of the variants for the compensation circuit 12 shown in FIGS. 2 and 3, the first operating mode is selected by setting by means of at least the switch $S_{11}$ the total resistance of the resistor network $R2R_1$ to a predetermined, first resistance value $R_{11}$ and by setting by means of at least the switch $S_{21}$ the total resistance of the resistor network $R2R_2$ to a predetermined, first resistance value $R_{21}$, especially a first resistance value $R_{21}$ equal to the resistance value $R_{11}$, and its second operating mode is selected by setting by means of at least the switch $S_{11}$ the total resistance of the resistor network $R2R_1$ to a predetermined, second resistance value, $R_{12}$, different from the first resistance value, $R_{11}$, and setting by means of at least the switch $S_{21}$ the total resistance of the resistor network $R2R_2$ to a second resistance value, $R_{22}$ different from the resistance value, $R_{21}$, and especially equal to the resistance value $R_{12}$. Used as analog switches, in such case, can be addressable switch arrays embodied, for example, as an integrated circuit (IC) and controllable, namely directly, by a digital compensation control signal $s_C$, examples being, for instance, type DG2018 of the firm Vishay or type ADG2128 of the firm Analog Devices, Inc. However, also discrete semiconductor switches can be used, in which case a separate digital decoder converts signal values transmitted encoded by the compensation control signal, in each case, into corresponding switch commands, namely switch commands effecting the switch positions of the semiconductor switches associated, in each case, with a selected operating mode of the compensation circuit.

FIG. 2 shows schematically a variant of switched resistor networks $2R2_1$, $2R2_2$, respectively a compensation circuit 12 formed therewith, serving for setting the voltage values for the compensation voltages. In this case, in the respectively selected operating mode i (i=1, 2 ... M), in each case, always exactly two resistance elements $r_{c11}$, $r_{c22}$ or $r_{c12}$, $r_{c22}$, respectively $r_{c1M}$, $r_{c2M}$ (here, resistance elements with the smallest index, namely $r_{c11}$ and $r_{c21}$ have the smallest ohmic resistance $R_{c11}$, respectively $R_{c21}$, respectively those with the index i, namely $r_{c11}$ and $r_{c21}$, have a smaller ohmic resistance $R_{c1i}$, respectively $R_{c2i}$, than those with the index i+1, namely $r_{c1i+1}$ and $r_{c2i+1}$) are activated, in each case, by means of an associated pair of analog switches $S_{11}$, $S_{12}$, respectively $S_{21}$, $S_{22}$, . . . . , in such a manner that by means of the two opposite-equally controlled switches $S_{12}$, $S_{22}$ the voltages $U_{PS}-\phi_{Ref}$, in each case, driving the direct current flowing in the two resistor networks $2R2_1$, $2R2_2$ are oppositely poled.

In the case of using a measuring electronics 1 corresponding to a combination of FIGS. 1 and 2, namely one having a measuring and control circuit 13 formed by means of the above described multi-subtractor as well as having the above-described variant of the compensation circuit 12, with the requirement that the discussed resistance elements $r_{c1i}$, $r_{c2i}$ . . . $r_{m1}$, $r_{m2}$, $r_{m3}$, $r_{m4}$ of the compensation circuit 12, respectively of the measuring and control circuit 13, are sized as regards their ohmic resistances according to the relationship $R_{m3}/R_{c1i}=R_{m4}/R_{c2i}$, and the compensation voltages $u_{c1}$, $u_{c2}$ additionally also satisfy the condition:

$$u_{c2} - u_{c1} = \pm (U_N - \varphi_{Ref}) \cdot \frac{1}{\left(1 + \frac{R_{c1i} + R_{c2i}}{R_{m3} + R_{m4}}\right)},$$

then an entry of undesired common mode components into the voltage difference $\Delta u_{12}$ is suppressed, respectively completely prevented. For the quite to be strived for case, in which additionally all resistance elements $r_{c1i}$, $r_{c2i}$, of the two resistor networks $2R2_1$, $2R2_2$ are, in each case, pairwise equally sized, in such a manner that as regards the ohmic resistance of the resistance elements $r_{c1i}$, and $r_{c2i}$, in each case, $R_{c1i}=R_{c2i}$, the aforementioned voltage difference $u_{c2}-u_{c1}$ of the compensation voltages $u_{c1}$, $u_{c2}$ is still further simplified as follows:

$$u_{c2} - u_{c1} = \pm (U_N - \varphi_{Ref}) \cdot \frac{1}{\left(1 + \frac{R_{c1i}}{R_{m3}}\right)} = \pm (U_N - \varphi_{Ref}) \cdot \frac{R_{m3}}{R_{m3} + R_{c1i}}.$$

In the case of the states of the switches $S_{11}$, $S_{12}$ $S_{21}$, $S_{22}$ shown in FIG. 2, namely in such a manner that the two switch $S_{11}$, $S_{21}$ selecting the respective resistance elements $r_{c11}$, $r_{c22}$ or $r_{c12}$, $r_{c22}$, respectively $r_{c1M}$, $r_{c2M}$ are operated always in the same way and the two other switches $S_{12}$, $S_{22}$, which establish, in each case, the polarity of the voltage $U_{PS}-\phi_{Ref}$ placed on the particular resistor network $2R2_1$, respectively $2R2_2$, are operated oppositely, the number of operating modes of the compensation circuit potentially to be turned on for the compensation circuit 12 shown in FIG. 2 corresponds, thus, to twice the totally used M pairs of resistance elements.

In the case of the variant of the compensation circuit 12 shown in FIG. 3, each of the 2·M resistance elements included in the two resistor networks is connected by means of a respectively associated switch $S_{11}$, $S_{21}$, $S_{12}$, $S_{22}$, . . . either with the reference potential $\phi_{Ref}$ or with the voltage value $U_{PS}$ of the operating voltage $u_W$ and each of the switches $S_{11}$, $S_{21}$, associated with the resistor network $2R2_1$ has, in each case, exactly one switch $S_{12}$, respectively $S_{22}$, complementary thereto, namely, in each case, associated with the other resistor network $2R2_2$ and operated oppositely, and vice versa, so that, in contrast, with M pairs of resistance elements, respectively switches, up to $2^M$ different voltage values for each of the two compensation voltages can be set, consequently up to $2^M$ operating modes can be implemented for the compensation circuit 12.

Figure 4:
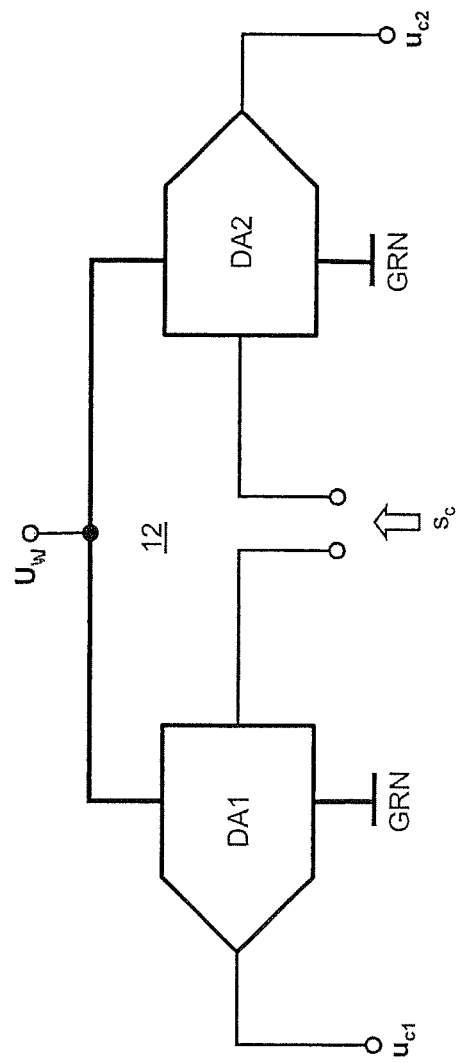

Instead of the passive resistor networks $2R2_1$, $2R2_2$ shown in FIGS. 2 and 3, there can, however, such as schematically presented in FIG. 4, also be used for forming the compensation circuit, respectively for generating the two compensation voltages $u_{c1}$, $u_{c2}$, for example, digital-to-analog converters DA1, DA2, which are operated by means of the—here digital—compensation control signal $s_C$, respectively which convert its digital signal values, in each case, into a corresponding analog direct voltage serving as compensation voltage $u_{c1}$, respectively $u_{c2}$, on an analog signal output serving, in each case, as one of the compensation voltage outputs. Just the application of conventional 8- or 16-bit-D/A converters, for example, of type DAC8552 of Texas Instruments, Inc. or also of type DAC161P997 ("single wire"-ΣΔ converters) of Texas Instruments, Inc., leads in very simple manner to a very finely stepped, consequently very exact, setting of the two compensation voltages $u_{c1}$, $u_{c2}$.

For the purpose of selecting for the current disturbance component the respectively best suitable operating mode of the compensation circuit, the latter includes, furthermore, a control signal input connected with a complementary compensation control output of the measuring and control circuit. The measuring and control circuit 13 is, in turn, adapted to provide on the compensation control output a compensation control signal $s_C$ for selecting one of the selectable operating modes of the compensation circuit 12, and, indeed, in such a manner that the compensation control signal $s_C$ has for selecting the first operating mode of the compensation circuit a first signal value corresponding to the first operating mode of the compensation circuit 12, respectively the compensation control signal has for selecting the second operating mode of the compensation circuit a second signal value corresponding to the second operating mode of the compensation circuit and different from the first signal value. The compensation signal $s_C$ is according to an additional embodiment of the invention embodied as a digital signal binary coding of the different signal values for all operating modes M of the compensation circuit potentially to be turned on, with M≥2. The compensation control signal $s_C$ can be embodied for this, for example, as a digital signal transmitting in parallel the bits coding the operating mode respectively to be turned on and having consequently a word breadth in bit of greater than $\log_2(M)$ corresponding to the total signal values to be coded or, for example, also embodied as a 1-bit digital signal serially transmitting the bits coding the operating mode respectively to be turned on.

Correspondingly, the control signal input of the compensation circuit 12, depending on the concrete embodiment of the compensation control signal, can be embodied as a parallel, respectively serial, digital interface, for example, thus in the form of a conventional "bitstream"-, "I2C"-, "parallel CMOS"-, "parallel LVDS"-, "serial I2C"-, "serial LVDS"-, "Serial SPI"-, "Single-Wire"-, or "SPI" interface.

In an additional embodiment, the compensation circuit and the measuring and control circuit are adapted together to set the voltage difference $\Delta u_{12}$ present on the input of the measuring circuit to less than a maximum value, $U_{12Max}$, predetermined therefor, for example, less than +5 V, respectively greater than a minimum value, $U_{12Min}$, predetermined therefor, for example, greater than −5 V; this is done, especially, in such a manner that the voltage difference $\Delta u_{12}$ is kept within the conversion range of $\Delta U_{12}=U_{12Max}-U_{12Min}$. The maximum value, $U_{12Max}$, corresponds, in such case, to an upper boundary of the conversion range, $\Delta U_{12}$, respectively establishes such, while the minimum value, $U_{12Min}$, corresponds to a boundary of the conversion range, respectively establishes such. As a result, the conversion range, $\Delta U_{12}$, corresponds to a difference, $U_{12Max}-U_{12Min}$, between the maximum value, $U_{12Max}$, and the minimum value, $U_{12Min}$, respectively is fixed thereby, in that the compensation circuit 12 and the measuring and control circuit 13 cooperate to keep the voltage difference $\Delta u_{12}$ within the predetermined conversion range, $\Delta U_{12}$.

Particularly for holding the voltage difference $\Delta u_{12}$ within the conversion range $\Delta U_{12}$ of the measuring and control circuit, such is adapted according to an additional embodiment to set the compensation control signal of the first signal value corresponding to the first operating mode of the compensation circuit and, after at least one digital value, $U_{DI}$, of first type, namely a digital value of the digital voltage measurement signal $u_D$, has been generated while the first operating mode of the compensation circuit is selected, to compare such with at least one predetermined, first reference value, $U_{r1}$. The reference value, $U_{r1}$, can be, for example, a predetermined minimum value, $U_{12Min}$, for a measured value, $U_{12}$, of the voltage difference $\Delta u_{12}$, which minimum value the voltage difference $\Delta u_{12}$ should, based on experience, at least have, in order to be able to let the first operating mode of the compensation circuit be set for a certain length of time, for example, longer than 1 s. The minimum value is, for example, 25% of the conversion range $\Delta U_{12}$, consequently the reference value, $U_{r1}$ can be set, for example, at about 25% of the conversion range $\Delta U_{12}$. In a further development of the invention, the measuring and control circuit is, furthermore, adapted also to be able to detect a subceeding of the first reference value, $U_{r1}$, by the digital value, $U_{DI}$, of first type and, in given cases, thereafter—not least of all also for increasing the voltage difference, $\Delta u_{12}$, to a measured value, $U_{12}$, which is greater than the minimum value predetermined therefor, $U_{12Min}$, for example, thus to between 20% and 80% of the conversion range $\Delta U_{12}$, and ideally lying at, for instance, 50% of the conversion range $\Delta U_{12}$—to set the compensation control signal at the second signal value corresponding to the second operating mode of the compensation circuit, consequently to cause a changing from the first into the second operating mode of the compensation circuit. In an additional embodiment of the invention, the measuring and control circuit is, furthermore, also adapted to compare at least one digital value, $U_{DII}$, of second type, namely a digital value of the digital voltage measurement signal $u_D$, which has been generated while the second operating mode of the compensation circuit is selected, with a predetermined, second reference value, $U_{r2}$. The second reference value, $U_{r2}$, can—analogously to the first reference value, $U_{r1}$—be a predetermined maximum value, $U_{12max}$, for a measured value, $U_{12}$, of the voltage difference $\Delta u_{12}$, which maximum value the voltage difference $\Delta u_{12}$ should, based on experience, at least have, in order to be able to set the second operating mode of the compensation circuit for a certain length of time, for example, longer than 1 s. For such purpose, the reference value, $U_{r2}$, can be set at, for example, about 75% of the conversion range $\Delta U_{12}$. In another, additional development of the invention, the measuring and control circuit is, furthermore, adapted to be able to detect an exceeding of the second reference value, $U_{r2}$, by the digital value, $U_{DII}$, of second type and, in given cases, thereafter—not least of all also for lessening the voltage difference $\Delta u_{12}$, to a measured value, $U_{12}$, which is less than the maximum value predetermined therefor, $U_{12max}$,—to set the compensation control signal to the first signal value corresponding to the first operating mode of the compensation circuit. In case required, for example, in order to enable a holding of the voltage difference $\Delta u_{12}$ as exactly as possible at, for instance, 50% of the conversion range $\Delta U_{12}$ even in the case of relatively large, respectively rapidly occurring, fluctuations in the disturbance component, the compensation circuit 12 can, of course, also have other operating modes of the aforementioned type, in which the compensation circuit can, with targeting, set the compensation voltages $u_{c1}$, $u_{c2}$ at suitable voltage values other than the aforementioned voltage values, $U_{c11}$, and $U_{c21}$, respectively $u_{c12}$, and $u_{c22}$, so that thus in cooperation with the measuring and control circuit the voltage difference $\Delta u_{12}$ can in comparison to a variant with only two operating modes be changed in smaller steps.

The measuring and control circuit is according to an additional embodiment adapted by means of the digital voltage measurement signal $u_D$ to generate a voltage difference sequence $\Delta u_D$, namely a sequence of digital values, $\Delta U_D$, each of which represents a difference between, in each case, two time-sequential digital values of the digital voltage measurement signal $u_D$. Particularly for the already mentioned case, in which the measuring electronics is provided for registering a physical, measured variable of a liquid, in given cases, a flowing liquid, the measuring and control circuit is, furthermore, so embodied that it generates no digital values, $\Delta U_D$, or, however, also rejects digital values, $\Delta U_D$, when there would be a difference between such digital values, $U_D$, which were generated during different operating modes of the compensation circuit. For the above described example, that sequentially in time, first of all, digital values, $U_{DI}$, of first type and then digital value, $U_{DII}$, of second type are generated, this means, thus, that the digital values, $\Delta U_D$, based on a digital value, $U_{DI}$, of first type and a digital value, $U_{DII}$, of second type, for instance, of the kind $\Delta U_S=U_{DII}-U_{DI}$ should not be generated. Resulting from this—with the requirement that the voltage values set for the compensation voltages $u_{c1}$, $u_{c2}$, are, in each case, held constant during a certain operating mode—the particular compensation voltages $u_{c1}$, $u_{c2}$ do not enter into the difference, respectively into the corresponding digital values, $U_D$, so that an exact knowledge of the actually set voltage values $U_{c11}$, $U_{c21}$, $u_{c12}$, $u_{c22}$ ... for the compensation voltages is not required.

The measuring electronics is embodied in the shown example of an embodiment as a subcomponent of a flow measuring device, for example, a magneto inductive, flow measuring device (MID), i.e. measuring system, for ascertaining a volume flow rate and/or a flow velocity of a flowing liquid based on a wanted component $\Delta\phi_W$ accordingly dependent on the volume flow rate, respectively flow velocity. In an additional embodiment of the invention, the measuring and control circuit is, in such case, adapted by means of the digital voltage measurement signal $u_D$ to generate, for example, also based on the above mentioned voltage difference sequence Duo, a sequence of measured values of flow $X_v$ representing, clocked with a updating rate $f_{sys}=1/T_{sys}$, the volume flow rate, in each case, instantaneously, namely for the duration $T_{sys}$ of a measurement cycle. For the case, in which the voltage difference sequence Duo contains or can contain also such digital values, $\Delta U_D$, which represent a difference between digital values, $U_D$, of the digital voltage measurement signal LID generated during different operating modes of the compensation circuit, the measuring and control circuit is, furthermore, adapted not to use, respectively to ignore, such digital values, $\Delta U_S$ in the ascertaining of a measured value of flow.

For guiding the liquid, especially a liquid flowing at least at times, the measuring system further comprises, supplementally to the measuring electronics 1, a measuring tube 2, on which the two measuring electrodes are arranged spaced from one another. The measuring electrodes are, in such case, especially, arranged such that their respective electrical potentials are dependent on electrical voltages arising, for example, due to charge carrier shifting within a liquid guided in the measuring tube. As schematically shown in FIG. 1, the measuring electrodes are, furthermore, so arranged for this that they are spaced from one another along an imaginary, peripheral, measuring tube line (here circularly shaped) surrounding a cross sectional area of the measuring tube. As usual in the case of such measuring systems, the two measuring electrodes can, in such case, be embodied as galvaniclly contactable measuring electrodes, namely measuring electrodes protruding, in each case, with an electrode tip of electrically conductive material, such as e.g. a metal, into a lumen of the measuring tube, and consequently contactable during operation by liquid guided in the measuring tube; the measuring electrodes can, however, also be, for example, capacitive measuring electrodes.

The measuring system according to an additional embodiment of the invention is embodied as a magneto inductive, flow measuring device (MID) and includes, consequently, furthermore, a magnetic field generator 3 for producing a magnetic field B at least partially passing through a lumen of the measuring tube 2, not least of all also within a region extending between the measuring electrodes. The magnetic field B additionally changes as a function of a magnetic field control signal appliable on a control signal input of the magnetic field generator. The magnetic field B—such as, for example, usual in the case of conventional MID—is preferably so embodied that it, not least of all also its wanted component $\Delta\phi_W$ influencing the potential difference, is periodically changing and has a magnetic field direction extending perpendicularly to an imaginary connecting axis imaginarily connecting the two measuring electrodes and changes with a frequency, $f_M=1/T_M$. As a result of this, also the wanted component $\Delta\phi_W$ of the potential difference $\Delta\phi_{12}$ itself is in the case of uniform flow velocity, respectively constant volume flow rate, variable with the predetermined clock signal period, $T_M$. The magnetic field generator can, such as quite usual in the case of such measuring systems, be formed, for example, by means of a coil arrangement integrated in an H-circuit.

For operating the magnetic field generator, including its supply of electrical energy, the measuring and control circuit 13 includes a magnetic field control signal output connected with the control signal input of the magnetic field generator 3 and the measuring and control circuit is adapted to provide on the magnetic field control signal output a magnetic field control signal $s_B$, for example, one alternating periodically. The magnetic field control signal serves to bring about an alternating, respectively periodic, change of the magnetic field produced by the magnetic field generator, this, especially, in such a manner that the wanted component $B_W$ of the magnetic field B has a magnetic field direction changing periodically with the frequency $f_M=1/T_M$. For such purpose, the magnetic field control signal $s_B$ can be embodied, for example, as a rectangular signal delivering a working clock period $T_M$ for the magnetic field generator with a pulse-to-pause ratio fixed or changeable during operation, respectively with corresponding frequency $f_M=1/T_M$ fixed or changeable during operation. Accordingly, the measuring and control circuit is in an additional embodiment of the invention adapted to output the magnetic field control signal as a rectangular signal alternating periodically with a frequency, $f_M=1/T_M$.

The invention claimed is:

1. A measuring electronics for ascertaining between a first measuring electrode a first electrical potential and a second measuring electrode exhibiting a second electrical potential a potential difference, said potential difference containing a time variable wanted component, which is less than a maximum voltage value predetermined therefor and greater than a minimum voltage value predetermined therefor and said potential difference containing a disturbance component, which is constant in time, respectively changes more slowly than the wanted component, the disturbance component is less than a maximum voltage value predetermined therefor, which is greater than the maximum voltage value, of the wanted component, and greater than a minimum voltage value predetermined therefor, which is less than the minimum voltage value, of the wanted component, said measuring electronics comprising:

a reference electrode exhibiting a reference potential;

an input circuit including a first circuit input formed by means of a non-inverting input of a first impedance converter and electrically connectable with the first measuring electrode a second circuit input formed by means of a non-inverting input of a second impedance converter and electrically connectable with the second measuring electrode, a first signal voltage output formed by means of an output of the first impedance converter, and a second signal voltage output formed by means of an output of the second impedance converter a compensation circuit including:
a first compensation voltage output,
a second compensation voltage output,
and a control signal input;
a measuring and control circuit including:
a first signal voltage input connected with the first signal voltage output of the input circuit
a second signal voltage input electrically connected with the second signal voltage output of the input circuit,
a third signal voltage input electrically connected with the first compensation voltage output of the compensation circuit,
and a fourth signal voltage input electrically connected with the second compensation voltage output of the compensation circuit;
and a compensation control output connected with the control signal input of the compensation circuit; wherein:
said input circuit is adapted to provide on the first signal voltage output a first signal voltage referenced to the reference potential and dependent on the first electrical potential and on the second signal voltage output a second signal voltage referenced to the reference potential and at least dependent on the second electrical potential,
said compensation circuit is adapted to provide on the first compensation voltage output a first compensation voltage, namely an adjustable first direct voltage referenced to the reference potential, and on the second compensation voltage output a second compensation voltage, namely a second direct voltage referenced to the reference potential,
said compensation circuit includes at least two operating modes selectable by means of a compensation control signal appliable on the control signal input and is adapted in a first operating mode to set the first compensation voltage at a first voltage value, $U_{c11}$, predetermined therefor and in a second operating mode to set the first compensation voltage at a second voltage value, $U_{c12}$, predetermined therefor, which is greater than the first voltage value, $U_{c11}$, predetermined for the first compensation voltage;
said measuring and control circuit is adapted to convert a voltage difference between a first compensated signal voltage dependent on both the first signal voltage as well as also the first compensation voltage and a second compensated signal voltage dependent on both the second signal voltage as well as also the second compensation voltage using a predeterminable, sampling rate and a digital resolution, into a digital voltage measurement signal representing the voltage difference, namely a sequence of digital values selected from a predetermined, stepped collection and each representing a quantized measured value of the voltage difference and lying within a predetermined conversion range; and
said measuring and control circuit is adapted to provide on the compensation control output a compensation control signal for selecting one of the selectable operating modes of the compensation circuit, in such a manner that the compensation control signal includes, for selecting the first operating mode of the compensation circuit a first signal value corresponding to the first operating mode of the compensation circuit, and, respectively, that the compensation control signal includes for selecting the second operating mode of the compensation circuit a second signal value corresponding to the second operating mode of the compensation circuit and different from the first signal value.

2. The measuring electronics as claimed in claim 1, wherein:
the digital resolution, with which the voltage difference is converted into the digital voltage measurement signal, amounts to greater than 20 bit.

3. The measuring electronics as claimed in claim 1, wherein:
said measuring and control circuit is adapted to set the compensation control signal to the first signal value corresponding to the first operating mode of the compensation circuit and thereafter to compare at least one digital value of first type, namely a digital value of the digital voltage measurement signal generated while the first operating mode of the compensation circuit is selected, with at least one predetermined, first reference value for a measured value of the voltage difference.

4. The measuring electronics as claimed in claim 3, wherein:
said measuring and control circuit is adapted to detect a subceeding of the first reference value, by the digital value of first type and thereafter to set the compensation control signal to the second signal value corresponding to the second operating mode of the compensation circuit for increasing the voltage difference.

5. The measuring electronics as claimed in claim 4, wherein:
said measuring and control circuit is adapted to compare at least one digital value of second type, namely a digital value of the digital voltage measurement signal generated while the second operating mode of the compensation circuit is selected, with a predetermined, second reference value.

6. The measuring electronics as claimed in claim 5, wherein:
said measuring and control circuit is adapted to detect an exceeding of the second reference value by the digital value of second type, and thereafter, for lessening the voltage difference, predetermined therefor, to set the compensation control signal to the first signal value corresponding to the first operating mode of the compensation circuit.

7. The measuring electronics as claimed in claim 1, wherein:
said compensation circuit and said measuring and control circuit are adapted to set the voltage difference to less than a maximum value, predetermined therefor.

8. The measuring electronics as claimed in claim 7, wherein:
the maximum value corresponds to an upper boundary of the conversion range, and the minimum value corresponds to a lower boundary of the conversion range; and/or
the conversion range corresponds to a difference between the maximum value and the minimum value.

9. The measuring electronics as claimed in claim 1, wherein:
said compensation circuit and said measuring and control circuit are adapted to keep the voltage difference within said predetermined conversion range.

10. The measuring electronics as claimed in claim 1, wherein:
said measuring and control circuit is adapted to produce a measurement voltage representing the voltage difference, and/or greater than a minimum voltage value.

11. The measuring electronics as claimed in claim 10, wherein:

said measuring and control circuit is adapted to output the measurement voltage as a multiple, of the voltage difference.

12. The measuring electronics as claimed in claim 10, wherein:
said measuring and control circuit includes a subtractor.

13. The measuring electronics as claimed in claim 12, wherein:
the first and third signal voltage inputs of said measuring and control circuit are formed by means of the non-inverting signal input of the subtractor and the second and fourth signal voltage inputs of the measuring and control circuit are formed by means of the inverting signal input of the subtractor; and/or
said subtractor is adapted to provide the measurement voltage on the measurement voltage output.

14. The measuring electronics as claimed in claim 1, wherein:
said measuring and control circuit includes an analog-to-digital converter with an analog signal input and with a digital signal output; and
the analog-to-digital converter is clocked with the sampling rate.

15. Measuring electronics as claimed in claim 12, wherein:
the analog signal input of said analog-to-digital converter is electrically connected with the measurement voltage output of the subtractor; and
said analog-to-digital converter is adapted to provide the digital voltage measurement signal on the digital signal output.

16. The measuring electronics as claimed in claim 14, wherein:
said analog-to-digital converter exhibits a nominal resolution of 24 bit.

17. The measuring electronics as claimed in claim 1, wherein:
said compensation circuit is adapted in the first operating mode to set the second compensation voltage at a first voltage value, predetermined therefor, which is greater than the first voltage value, of the first compensation voltage, and/or
said compensation circuit is adapted in the second operating mode to set the second compensation voltage at a second voltage value, predetermined therefor, which is less than the second voltage value, of the first compensation voltage.

18. The measuring electronics as claimed in claim 17, wherein:
said compensation circuit is adapted in the first operating mode to set the second compensation voltage to a voltage value, $U_{c21}$, and in the second operating mode to set the second compensation voltage to a voltage value, $U_{c22}$, in such a manner that a compensation voltage difference, namely a voltage difference set between the first compensation voltage and the second compensation voltage, assumes in the first operating mode a voltage value, $U_{c11}-U_{c21}$ which is different from a voltage value, $U_{c12}-U_{c22}$, which the compensation voltage difference assumes in the second operating mode.

19. The measuring electronics as claimed in claim 1, wherein:
said compensation circuit includes at least a first digital-to-analog converter including a digital signal input and an analog signal output.

20. The measuring electronics as claimed in claim 19, wherein:

the first compensation voltage output of the compensation circuit is formed by means of the analog signal output of the at least one digital-to-analog converter; and/or
said digital-to-analog converter is adapted to set the first compensation voltage; and/or
the control signal input of said compensation circuit is formed by means of the digital signal input on said at least one digital-to-analog converter; and/or
said digital-to-analog converter is adapted to provide on its analog signal output a variable, direct voltage dependent on the control signal.

21. The measuring electronics as claimed in claim 19, wherein:
said compensation circuit includes a second digital-to-analog converter including a digital signal input an analog signal output.

22. The measuring electronics as claimed in claim 1, wherein:
said input circuit is adapted such that the first signal voltage on the first signal voltage output depends also on the second signal voltage on the second signal voltage output and that the second signal voltage on the second signal voltage output depends also on the first signal voltage on the first signal voltage output.

23. The measuring electronics as claimed in claim 1, further comprising:
a power supply circuit, which is adapted to provide an operating voltage, especially an operating voltage controlled at a voltage value, for supplying said input circuit, as well as said compensation circuit.

24. A measuring system for ascertaining a volume flow rate and/or a flow velocity of a flowing liquid, which measuring system comprises:
a measuring electronics as claimed in claim 1;
a measuring tube for guiding the liquid; as well as
arranged spaced from one another on said measuring tube, two measuring electrodes, of which a first measuring electrode is connected with the first circuit input of said input circuit and a second measuring electrode is connected with the second circuit input of said input circuit.

25. The measuring system as claimed in claim 24, wherein:
said measuring electrodes are adapted such that their respective electrical potentials depend on electrical voltages arising in a liquid guided in the measuring tube; and/or
said measuring electrodes are arranged spaced from one another on the measuring tube along an imaginary peripheral line on the measuring tube; and/or
each of said measuring electrodes is contactable by a liquid guided in said measuring tube.

26. The measuring system as claimed in claim 24, further comprising:
a magnetic field generator including a control signal input, wherein:
said magnetic field generator is adapted to produce at least partially passing through a lumen of said measuring tube, which magnetic field changes as a function of a magnetic field control signal appliable to the control signal input.

27. The measuring system as claimed in claim 26, wherein:
said measuring and control circuit of the measuring electronics includes a magnetic field control signal output connected with the control signal input of said magnetic field generator and is adapted to provide on the magnetic field control signal output a magnetic field control signal.

28. The measuring system as a claimed in claim 27, wherein:
the magnetic field control signal is embodied as a rectangular signal; and/or
the magnetic field control signal effects an alternating, change of the magnetic field produced by said magnetic field generator.

29. The measuring system according to claim 27, wherein:
said measuring and control circuit is adapted to output the magnetic field control signal as a rectangular signal alternating periodically.

30. The measuring system as claimed in claim 24, wherein:
said measuring and control circuit is adapted to generate by means of the digital voltage measurement signal a sequence of measured values of flow instantaneously representing the volume flow rate.

31. The measuring system as claimed in claim 30, wherein:
said measuring and control circuit is adapted to generate by means of the digital voltage measurement signal a voltage difference sequence, namely a sequence of digital values, each of which represents a difference between two time-sequential digital values of the digital voltage measurement signal.

32. The measuring system as claimed in claim 31, wherein:
said measuring and control circuit is adapted not to generate digital values representing a difference between digital values, representing the digital voltage measurement signal and being generated during different operating modes of the compensation circuit.

33. The measuring system as claimed in claim 31, wherein:
said measuring and control circuit is adapted to generate by means of the voltage difference sequence the sequence of measured values of flow instantaneously representing the volume flow rate.

34. The measuring system as claimed in claim 33, wherein:
said measuring and control circuit is adapted not to use, for ascertaining a measured value of flow, such digital values of the voltage difference sequence, which represent a difference between digital values of the digital voltage measurement signal generated during different operating modes of the compensation circuit.

35. The measuring system as claimed in claim 24, wherein each of said two measuring electrodes protrudes with an electrode tip into a lumen of said measuring tube.

36. The measuring system as claimed in claim 26, wherein the magnetic field changes as a function of a magnetic field control signal appliable to the control signal input in such a manner that the magnetic field includes, extending perpendicularly to an imaginary connecting axis imaginarily connecting said two measuring electrodes and influencing the wanted component of the potential difference, a wanted component with a periodically changing magnetic field direction.

37. The measuring electronics as claimed in claim 1, wherein: the potential difference potential difference dependent on a volume flow rate of a flowing liquid exposed to a magnetic field.

38. The measuring electronics as claimed in claim 1, wherein: the wanted component of the potential difference varying with a predetermined period.

39. The measuring electronics as claimed in claim 1, wherein: the reference electrode exhibits a fixed reference potential.

40. The measuring electronics as claimed in claim 1, wherein: the input circuit is adapted to provide said first signal voltage and said second signal voltage that a voltage difference between the first signal voltage and the second signal voltage equals a predetermined multiple of the potential difference.

41. The measuring electronics as claimed in claim 1, wherein: the input circuit is adapted to provide said first signal voltage and said second signal voltage that a voltage difference between the first signal voltage and the second signal voltage is less than 5-times the potential difference.

42. The measuring electronics as claimed in claim 1, wherein: the compensation circuit is adapted to provide said first compensation voltage and said second compensation voltage in such a manner that between the first compensation voltage and the second compensation voltage a voltage difference corresponds to greater than 25% of an instantaneous voltage value of the disturbance component.

43. The measuring electronics as claimed in claim 1, wherein: the second compensation voltage is an adjustable direct voltage.

44. The measuring electronics as claimed in claim 1, wherein: the second compensation voltage is fixed direct voltage.

45. The measuring electronics as claimed in claim 1, wherein: said measuring and control circuit is adapted to convert said voltage difference using a digital resolution greater than 16 bit.

46. The measuring electronics as claimed in claim 1, wherein: said measuring and control circuit is adapted to produce a measurement voltage representing the voltage difference that the measurement voltage lies within a predetermined measurement voltage range, which is less than 5V.

47. The measuring electronics as claimed in claim 1, wherein: said input circuit is adapted such that the first signal voltage on the first signal voltage output depends also on the second signal voltage on the second signal voltage output and that the second signal voltage on the second signal voltage output depends also on the first signal voltage on the first signal voltage output in such a manner that a potential difference between the first signal voltage and the second signal voltage is proportional to the voltage difference.

48. measuring electronics as claimed in claim 7, wherein: said compensation circuit and said measuring and control circuit are adapted to set the voltage difference to less than +5 V.

49. The measuring electronics as claimed in claim 7, wherein: said compensation circuit and said measuring and control circuit are adapted to set the voltage difference to greater than 5 V.

50. The measuring electronics as claimed in claim 7, wherein: said compensation circuit and said measuring and control circuit are adapted to keep the voltage difference within the predetermined conversion range.

51. The measuring electronics as claimed in claim 12, wherein: said subtractor of the measuring and control circuit is formed by means of a positive feedback difference amplifier including an inverting signal input, a non-inverting signal input and a measurement voltage output.

52. The measuring electronics as claimed in claim 19, wherein: the digital signal input of the at least a first digital-to-analog converter is adapted to receive the control signal of the measuring and control circuit.

53. The measuring electronics as claimed in claim 19, wherein: the digital signal input of the at least a first digital-to-analog converter is adapted to form the control signal input of the compensation circuit.

54. The measuring electronics as claimed in claim 19, wherein: the analog signal output of the at least a first digital-to-analog converter is adapted to deliver the first compensation voltage.

55. The measuring electronics as claimed in claim 19, wherein: the analog signal output of the at least a first digital-to-analog converter is adapted to form the first compensation voltage output.

* * * * *